(12) United States Patent
Yamada et al.

(10) Patent No.: US 9,000,602 B2
(45) Date of Patent: Apr. 7, 2015

(54) ELECTRICITY-LIQUID HYBRID LIQUID-PRESSURE APPARATUS

(75) Inventors: Masahiro Yamada, Kobe (JP); Yukito Imamura, Kobe (JP); Tadashi Anada, Kobe (JP); Masahiro Suzuki, Kobe (JP)

(73) Assignee: Kawasaki Jukogyo Kabushiki Kaisha, Kobe-Shi (JP)

( * ) Notice: Subject to any disclaimer, the term of this patent is extended or adjusted under 35 U.S.C. 154(b) by 227 days.

(21) Appl. No.: 13/816,099

(22) PCT Filed: Aug. 17, 2010

(86) PCT No.: PCT/JP2010/005079
§ 371 (c)(1),
(2), (4) Date: Apr. 1, 2013

(87) PCT Pub. No.: WO2012/023155
PCT Pub. Date: Feb. 23, 2012

(65) Prior Publication Data
US 2013/0177394 A1    Jul. 11, 2013

(51) Int. Cl.
| | | |
|---|---|---|
| F02B 63/04 | (2006.01) | |
| F03G 7/08 | (2006.01) | |
| H02K 7/18 | (2006.01) | |
| F04B 17/03 | (2006.01) | |
| F03C 1/06 | (2006.01) | |
| F04B 1/14 | (2006.01) | |
| F04D 15/00 | (2006.01) | |
| H02K 7/00 | (2006.01) | |
| F04B 1/20 | (2006.01) | |

(52) U.S. Cl.
CPC ............... *F04D 15/00* (2013.01); *F04B 17/03* (2013.01); *F03C 1/0644* (2013.01); *F04B 1/141* (2013.01); *F04B 2201/0805* (2013.01); *H02K 7/00* (2013.01); *F03C 1/0623* (2013.01); *F04B 1/2085* (2013.01); *F04B 1/2014* (2013.01)

(58) Field of Classification Search
CPC ......... F04D 15/00; H02K 7/00; F03C 1/0623; F03C 1/0644; F04B 1/141; F04B 2201/0805; F04B 1/2014; F04B 17/03; F04B 1/2085
USPC ............................................... 415/10; 310/66
See application file for complete search history.

(56) References Cited

U.S. PATENT DOCUMENTS 6,592,336 B1 * 7/2003 Hirano et al. ............... 417/201
8,358,042 B2 * 1/2013 Yamada et al. .............. 310/82

FOREIGN PATENT DOCUMENTS

| JP | B1-49-23493 | 6/1974 |
|---|---|---|
| JP | A-09-196014 | 7/1997 |
| JP | A-11-303724 | 11/1999 |
| JP | A-2000-303949 | 10/2000 |
| JP | A-2009-209725 | 9/2009 |
| JP | A-2010-190125 | 9/2010 |

OTHER PUBLICATIONS
International Search Report dated Nov. 16, 2010 for International Patent Application No. PCT/JP2010/005079.

\* cited by examiner

*Primary Examiner* — Javaid Nasri
(74) *Attorney, Agent, or Firm* — Oliff PLC

(57) ABSTRACT

An electricity-oil hybrid motor 1 includes an oil-pressure motor 10 and an electric motor 30. The electricity-oil hybrid motor 1 includes a rotating shaft 11 and causes the rotating shaft 11 to rotate by supplied operating oil. The electric motor 30 includes a rotor 32 connected to the rotating shaft 11, a stator 33 provided around the rotor 32, and a housing 34 in which the rotor 32 and the stator 33 are accommodated. The rotor 32 and the housing 34 are provided so as to surround and cover a casing 17 of the oil-pressure motor 10. The housing 34 includes a rotating shaft accommodating space 51 in which the rotating shaft 11 is accommodated and a stator accommodating space 52 in which the stator is accommodated. A sealing member 39 configured to separate the accommodating spaces 51 and 52 is provided in the housing 34.

12 Claims, 6 Drawing Sheets

ELECTRICITY-LIQUID HYBRID LIQUID-PRESSURE APPARATUS

TECHNICAL FIELD

The present invention relates to an electricity-liquid hybrid liquid-pressure apparatus including: a liquid-pressure rotating device including a rotating shaft and configured to cause the rotating shaft to rotate by supply of an operating liquid or configured to eject the operating liquid in accordance with the rotation of the rotating shaft; and an electric rotating device including a rotor connected to the rotating shaft and a stator provided around the rotor. For example, the present invention relates to an electricity-oil hybrid motor/pump including an oil-pressure motor/oil-pressure pump and an electric motor/power generator.

BACKGROUND ART

In construction machineries, ships, land devices, and the like, an oil-pressure motor or an electric motor is often used for rotary drive. In recent years, attempts to reduce energy consumption by using both the oil-pressure motor and the electric motor have been made. As one example, an electricity-oil hybrid motor has been developed, in which the oil-pressure motor and the electric motor are integrated by connecting a shaft of the oil-pressure motor and a shaft of the electric motor via a coupling. According to this electricity-oil hybrid motor, the oil-pressure motor and the electric motor are provided in the same casing, and the casing is filled with oil (see PTL 1, for example).

CITATION LIST

Patent Literature

PTL 1: Japanese Laid-Open Patent Application Publication No. 2009-209725

SUMMARY OF INVENTION

Technical Problem

Unlike the oil-pressure motor, the electric motor drives by applying current to the stator or the rotor. Therefore, in a case where the oil, which fills the casing, contains impurities or contaminants, such as iron powder, having electrical conductivity or magnetism, electric short or magnetic short occurs by the stator or the rotor provided in the casing, and the electric motor stops operating. Therefore, the oil to be used is limited to oil which does not contain impurities or contaminants, is high in cleanliness, and has no electrical conductivity and no magnetism. In the oil-pressure motor, the operating oil is generally leaking through minute gaps among respective components, and the operating oil lubricates, for example, bearings in the oil-pressure motor. On this account, the casing is filled with the operating oil. In the electric motor, the operating oil is used as cooling oil or lubricating oil. However, because of the above-described problems of the electric short and magnetic short, the operating oil to be used is limited.

Here, an object of the present invention is to provide an electricity-liquid hybrid liquid-pressure apparatus configured such that there are few restrictions on the types of usable operating liquids.

Solution to Problem

An electricity-liquid hybrid liquid-pressure apparatus of the present invention includes: a liquid-pressure rotating device configured to cause a rotating shaft to rotate by supply of an operating liquid or configured to eject the operating liquid in accordance with rotation of the rotating shaft, the rotating shaft projecting from a casing of the liquid-pressure rotating device; and an electric rotating device configured to have a power generator function of converting rotational energy of the rotating shaft of the liquid-pressure rotating device into electric energy or an electric motor function of driving the rotating shaft of the liquid-pressure rotating device by supply of the electric energy, wherein: the electric rotating device includes a rotor connected to the rotating shaft, a stator provided around the rotor, and a housing in which the rotor and the stator are accommodated; the rotor and the housing are provided so as to surround the casing; the housing includes a first accommodating space in which the rotating shaft projecting from the casing is accommodated and a second accommodating space in which the stator is accommodated; and a sealing member configured to separate the first accommodating space from the second accommodating space is provided in the housing.

According to the present invention, even if the operating liquid in the casing flows through a space around the rotating shaft into the first accommodating space, the sealing member can prevent the operating liquid from flowing into the second accommodating space. With this, the operating liquid having the electrical conductivity or the magnetism can be prevented from flowing into a space between the rotor and the stator, and the deterioration of the performance of the electric rotating device can be prevented. As above, the operating liquid having the electrical conductivity or the magnetism can be used. Therefore, it is possible to increase the types of usable operating liquids.

In the above invention, it is preferable that the rotor be rotatably provided at the casing via a first bearing member, and the bearing member be provided in the first space.

According to the above configuration, the rotor is attached via the bearing member to an outer peripheral portion of the liquid-pressure rotating device, the outer peripheral portion being less affected by vibrations and displacements during the operations of the liquid-pressure rotating device. Thus, the transfer of the vibrations to the rotor can be prevented. In addition, the formation of a member for receiving the bearing member is unnecessary, and the configuration of the electric rotating device can be simplified. By providing the bearing member in the first space, the operating liquid can be utilized to lubricate the bearing member of the rotor. With this, unlike conventional electric motors, it is unnecessary to use semi-solid or paste lubricant, such as grease. Therefore, the electricity-oil hybrid motor can be used under more severe conditions (under a high-load condition for a long period of time) than before. In addition, the energy efficiency can be improved, and the noises can be reduced.

In the above invention, it is preferable that: the electricity-liquid hybrid liquid-pressure apparatus further include an input-output shaft configured to receive or output rotational force; the input-output shaft be formed integrally with the rotor; the rotating shaft engage with the rotor so as not to be relatively rotatable with respect to the rotor; the rotor be formed in a bottomed tubular shape and be provided at the casing so as to close a through hole of the casing from which the rotating shaft projects; and the sealing member be provided between an inner peripheral portion of the rotor and an outer peripheral portion of the casing.

According to the above configuration, an external device and the electric rotating device can be directly connected to each other. Thus, the energy efficiency can be improved, and the assembly accuracy can be set to a low level. In addition, since the rotor is provided so as to close the through hole of the casing, and the sealing member is provided between the inner peripheral portion of the rotor and the outer peripheral portion of the casing, the operating liquid having flowed through the through hole into the housing can be prevented from flowing into the second accommodating space. Further, since the operating liquid flowing through the through hole into the housing can be prevented from flowing out by one sealing member, the number of parts can be reduced, and the configuration of the electric rotating device can be simplified.

In the above invention, it is preferable that the rotating shaft penetrate the rotor and the housing and project to outside of the housing, and the rotor and the rotating shaft engage with each other so as not to be relatively rotatable with respect to each other.

According to the above configuration, an external device and the liquid-pressure rotating device can be directly connected to each other. Thus, the energy efficiency can be improved, and the assembly accuracy can be set to a low level.

In the above invention, it is preferable that the rotor be formed in a tubular shape and be provided such that one end side and the other end side thereof are rotatably supported by the casing and the housing via the bearing member and a different bearing member, respectively.

According to the above configuration, since one end side and the other end side of the rotor are respectively supported by the bearing members, the rotor can stably rotate.

An industrial machinery of the present invention includes any one of the above electricity-liquid hybrid liquid-pressure apparatuses. According to the above configuration, it is possible to realize the industrial machinery including the electricity-liquid hybrid liquid-pressure apparatus having the above effects.

Advantageous Effects of Invention

According to the present invention, the mechanical efficiency can be improved, and the operation noises and the cost can be reduced.

DESCRIPTION OF EMBODIMENTS

Embodiment 1

Figure 1:
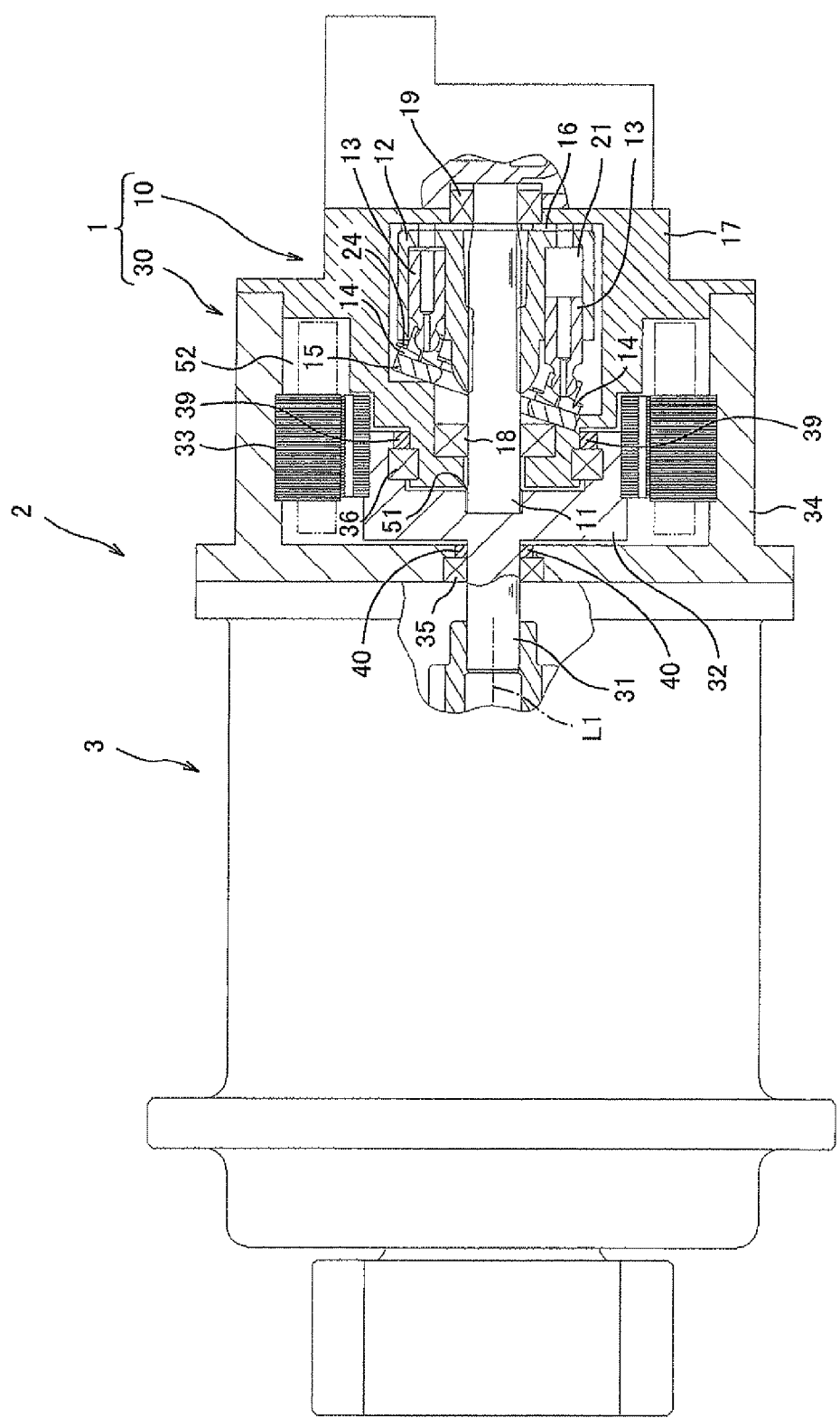
FIG. 1 is a diagram showing a driving device including an electricity-oil hybrid motor of Embodiment 1 of the present invention.
Figure 2:
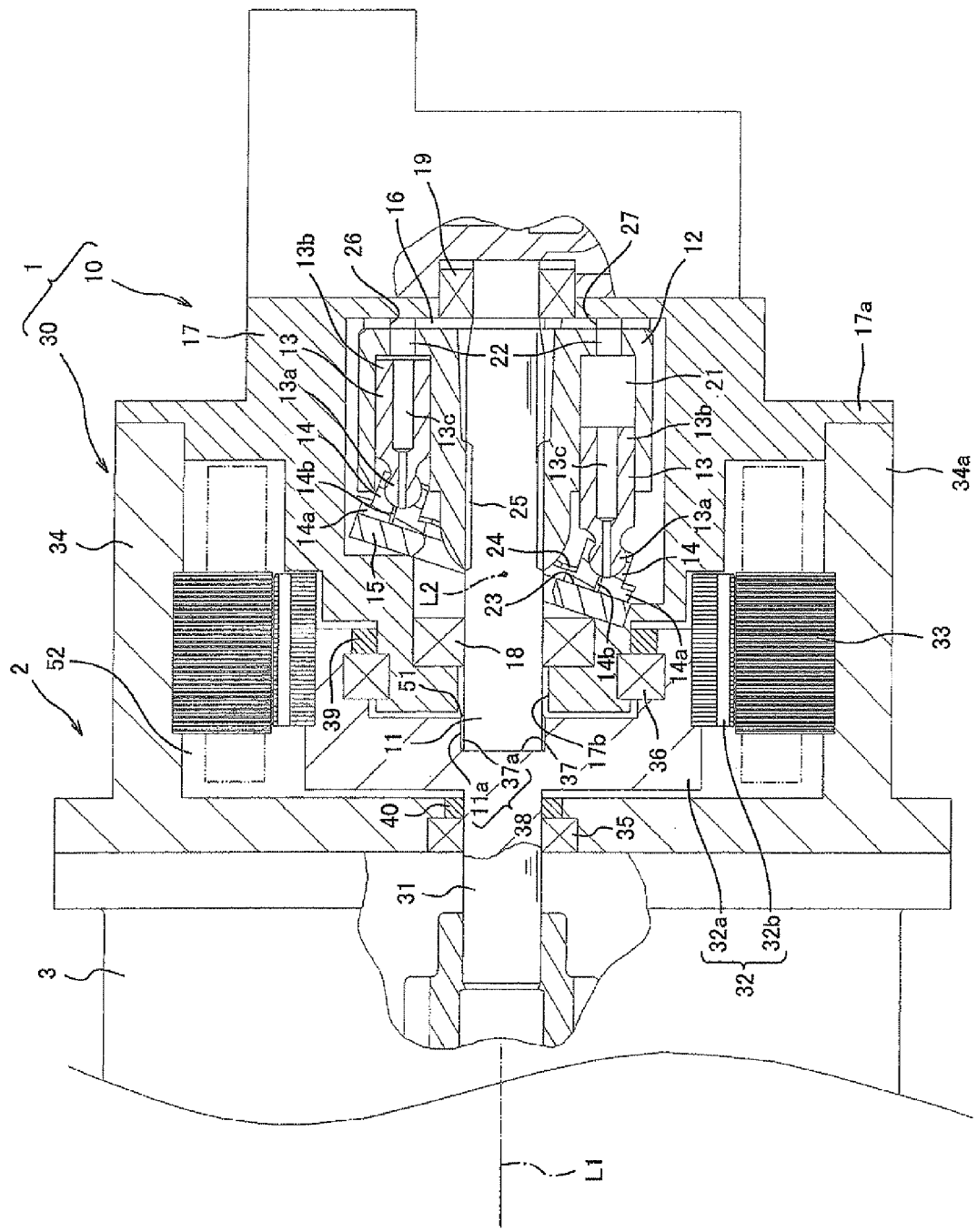
FIG. 2 is an enlarged view of the electricity-oil hybrid motor.

FIG. 1 is a diagram showing a rotary driving device 2 including an electricity-oil hybrid motor 1 of Embodiment 1 of the present invention. FIG. 2 is an enlarged view of the electricity-oil hybrid motor 1. In construction machineries, ships, land devices, and the like, the electricity-oil hybrid motor 1 that is an electricity-liquid hybrid liquid-pressure apparatus is included in the rotary driving device 2 configured to cause a rotated object to rotate. Examples of the construction machineries are oil-pressure shovels, cranes, and bulldozers, and examples of the land devices are oil-pressure units, pressing machines, iron making machines, and injection molding machines. The electricity-oil hybrid motor 1 is coupled to a speed reducer 3 included in the rotary driving device 2 and causes the rotated object to rotate via the speed reducer 3. The electricity-oil hybrid motor 1 includes a liquid-pressure rotating device 10 configured to cause a rotating shaft 11 to rotate by operating oil and an electric rotating device 30 configured to cause an output shaft 31 to rotate by electricity, and the liquid-pressure rotating device 10 and the electric rotating device 30 are integrally formed.

Oil-Pressure Motor

The liquid-pressure rotating device 10 can cause the rotating shaft 11 to rotate by the supply of the operating oil and is an oil-pressure motor, such as a fixed displacement swash plate type piston motor. Moreover, the liquid-pressure rotating device 10 can operate as an oil-pressure pump configured to cause the rotating shaft 11 to rotate to suction and eject pressure oil. To be specific, the liquid-pressure rotating device 10 is configured as an oil-pressure motor/pump. In the following explanation, for convenience of explanation, the liquid-pressure rotating device 10 will be explained as an oil-pressure motor.

An oil-pressure motor 10 that is the liquid-pressure rotating device 10 includes the rotating shaft 11, a cylinder block 12, a plurality of pistons 13, a plurality of shoes 14, a swash plate 15, and a valve plate 16, and these components are accommodated in a casing 17. The rotating shaft 11 is provided in the casing 17, and one end portion thereof projects from a through hole 17b of the casing 17. Then, a portion on the one end portion side of the rotating shaft 11 and the other end portion of the rotating shaft 11 are supported by the casing 17 via bearings 18 and 19, respectively. In addition, a portion on the other end portion side of the rotating shaft 11 is fittingly inserted in the cylinder block 12.

The cylinder block 12 is formed in a substantially cylindrical shape and is, for example, splined to the rotating shaft 11. The rotating shaft 11 and the cylinder block 12 cannot relatively rotate with respect to each other. A plurality of piston chambers 21 are formed in the cylinder block 12. The plurality of piston chambers 21 are formed to be spaced apart from one another in a circumferential direction at regular intervals. One end side of each piston chamber 21 is open at one end of the cylinder block 12, and the other end side thereof is open at the other end of the cylinder block 12 via a cylinder port 22. The pistons 13 are respectively inserted into the piston chambers 21 from one end side.

The piston 13 is fittingly inserted in the piston chamber 21 and performs a reciprocating movement in the piston chamber 21. At least one end portion 13a of the piston 13 projects from the piston chamber 21. An outer surface of the one end portion 13a of the piston 13 is formed in a spherical shape, and the shoe 14 is attached to the one end portion 13a. The shoe 14 is formed in a substantially bottomed cylindrical shape. An inner surface of the shoe 14 has a partially spherical shape, and the one end portion 13a of the piston 13 is fittingly inserted in the inner surface of the shoe 14 and rotates about its center point. A flange 14a projecting outward is formed at an outer peripheral surface of a bottom portion of the shoe 14.

The swash plate 15 is formed in a substantially circular plate shape. The rotating shaft 11 is inserted through the swash plate 15, and the swash plate 15 is provided closer to the one end portion of the rotating shaft 11 than the cylinder block 12. The swash plate 15 is provided in the casing 17 so as to be inclined about an axis line L2 perpendicular to an axis line L1 of the rotating shaft 11. The swash plate 15 includes a supporting surface 23 on its surface opposed to the cylinder block 12. The plurality of shoes 14 are provided on the supporting surface 23. The plurality of shoes 14 provided on the supporting surface 23 are pressed against the supporting surface 23 by a retainer plate 24 provided on the rotating shaft 11.

The retainer plate 24 is formed in a substantially annular shape. A spherical bushing 25 formed between the cylinder block 12 and the swash plate 15 is fittingly inserted in an inner peripheral portion of the retainer plate 24, and the retainer plate 24 is supported by an outer peripheral surface of the spherical bushing 25. The retainer plate 24 is opposed to the supporting surface 23 of the swash plate 15, and the shoes 14 are supported on the supporting surface 23 by sandwiching the flanges 14a of the shoes 14 between the retainer plate 24 and the supporting surface 23.

In the shoe 14 supported as above, an oil passage 14b penetrating from the inner surface of the shoe 14 toward the supporting surface 23 is formed. In the piston 13, an oil passage 13c penetrating from the one end portion 13a to the other end portion 13b is formed. Therefore, the operating oil in the piston chamber 21 is supplied to the supporting surface 23, and thus the shoes 14 can smoothly move on the supporting surface 23. The operating oil on the supporting surface 23 accumulates in the casing 17 and is utilized as lubricating oil for causing the rotating shaft 11 to smoothly rotate.

The valve plate 16 is fixed to an inner peripheral surface of the casing 17. The valve plate 16 is formed in a substantially circular plate shape. The other end portion of the rotating shaft 11 is inserted through the valve plate 16 so as to be relatively rotatable with respect to the valve plate 16. One thickness-direction surface of the valve plate 16 is opposed to and contacts the other end of the cylinder block 12 in a sealed state. A circular-arc inlet port 26 and a circular-arc outlet port 27 are formed on the valve plate 16 so as to be spaced apart from each other in the circumferential direction. Some piston chambers 21 are connected to each of the inlet port 26 and the outlet port 27. Each of the piston chambers 21 is formed so as to be connected to the inlet port 26 and the outlet port 27 alternately by the rotation of the cylinder block 12. In FIGS. 1 and 2, for ease of understanding, the positions of the inlet port 26 and outlet port 27 are displaced in the circumferential direction (the same is true in FIGS. 4 to 6 described below).

According to the oil-pressure motor 10, the operating oil is supplied to the piston chambers 21 through the inlet port 26, and the supplied operating oil is ejected from the piston chambers 21 through the outlet port 27. Thus, the pistons 13 perform the reciprocating movement. The swash plate 15 and the retainer plate 24 are inclined. Therefore, when the pistons 13 perform the reciprocating movement, the shoes 14 slide on the swash plate 15, and the cylinder block 12 rotates about the axis line L1. Since the rotating shaft 11 is not relatively rotatable with respect to the cylinder block 12, the rotating shaft 11 also rotates in conjunction with the cylinder block 12. The electric motor 30 is provided integrally with the oil-pressure motor 10 configured as above.

Electric Motor

Figure 3:
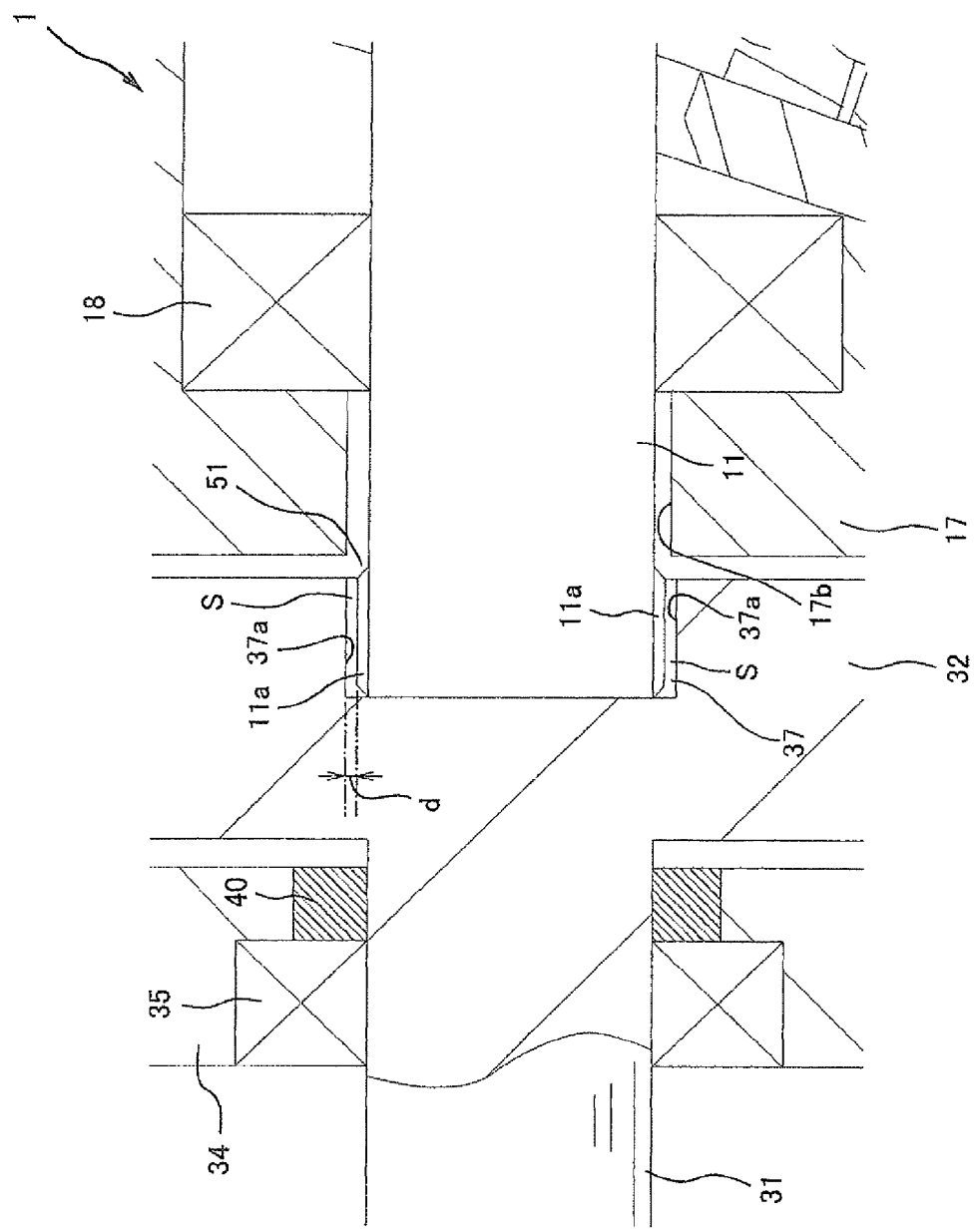
FIG. 3 is an enlarged cross-sectional view of a part of an electric motor.

FIG. 3 is an enlarged cross-sectional view of a part of the electric motor 30. The following explanation also refers to FIGS. 1 and 2. The electric rotating device 30 rotates by the supply of electricity, that is, has an electric motor function. In addition, the electric rotating device 30 causes the output shaft 31 to rotate to convert the energy of the rotation into electric energy, that is, has a power generator function. To be specific, the electric rotating device 30 is configured as an electric motor/power generator including the electric motor function and the power generator function. In the following explanation, for convenience of explanation, the electric rotating device 30 will be explained as an electric motor.

The electric motor 30 that is the electric rotating device is a so-called three-phase synchronous motor. The electric motor 30 includes the output shaft 31, a rotor 32, and a stator 33, and these components are accommodated in a housing 34 formed in a bottomed cylindrical shape. The housing 34 is formed in a bottomed cylindrical shape and is provided on the casing 17 so as to cover an outer peripheral surface of the oil-pressure motor 10.

An outward flange portion 17a projecting outward in a radial direction is formed on an axially intermediate portion of an outer peripheral surface of the casing 17 over the entire periphery of the axially intermediate portion in the circumferential direction. An opening end portion 34a of the housing 34 is fixed to the outward flange portion 17a. With this, a portion of one end side of the casing 17 (portion on a side where the rotating shaft 11 projects) is accommodated in the housing 34, and the electric motor 30 is provided to cover the outer peripheral surface of the oil-pressure motor 10. Thus, the oil-pressure motor 10 and the electric motor 30 are integrally formed.

One end portion of the output shaft 31 projects from a bottom portion of the housing 34 and is coupled to the speed reducer 3. The one end portion of the output shaft 31 is rotatably supported by the housing 34 via a bearing 35, and the other end portion thereof is formed integrally with the rotor 32. In the present embodiment, the output shaft 31 and the rotor 32 are formed as one component. However, the output shaft 31 and the rotor 32 may be formed as separate components and may be integrated by fastening them using a fastening member, such as a screw.

The rotor 32 includes an iron core 32a formed in a bottomed tubular shape. The output shaft 31 is integrally formed on an outer bottom surface of the iron core 32a. The output shaft 31 and the iron core 32a are arranged such that the axis of the output shaft 31 and the axis of the iron core 32a coincide with each other. One end portion of the casing 17 is inserted in the iron core 32a. The iron core 32a is rotatably provided on the outer peripheral surface of the casing 17 via a bearing 36. The iron core 32a is provided to cover the casing 17 and close the through hole 17b. The inside of the iron core 32a communicates with the inside of the casing 17 through the through hole 17b. In the iron core 32a, a rotating shaft accommodating space 51 (corresponding to a first accommodating space) capable of accommodating the rotating shaft 11 is formed.

A recess 37 into which the rotating shaft 11 of the inserted oil-pressure motor 10 is inserted is formed on an inner bottom surface of the iron core 32a. A plurality of keyways 37a extending in parallel with the axis line L1 and formed for spline coupling are formed on an inner peripheral surface of the recess 37 so as to be spaced apart from one another in the circumferential direction. A plurality of keys 11a corresponding to the plurality of keyways 37a are formed on one end portion of the rotating shaft 11. The plurality of keys 11a extend in parallel with the axis line L1 and are formed to be spaced apart from one another in the circumferential direction. The iron core 32a and the rotating shaft 11 engage with each other such that the recess 37 and the keys 11a engage with each other.

The keyways 37a and the keys 11a are designed such that a valley portion of each keyway 37a and a tip end portion of each key 11a are spaced apart from each other by a predetermined distance d in the radial direction. With this, a gap S is formed between the keyway 37a and the key 11a, and the relative displacement of the rotating shaft 11 with respect to the rotor 32 in the recess 37 is allowed. The keyways 37a and the keys 11a constitute a spline joint portion 38.

As above, by configuring the spline joint portion 38, the rotating shaft 11 and the rotor 32 can rotate in conjunction with each other, and the transfer of axial vibrations of the rotating shaft 11 to the rotor 32 can be suppressed. In addition, since the above relative displacement is allowed by the radial gaps S formed at the spline joint portion 38, the transfer of radial vibrations of the rotating shaft 11 to the rotor 32 can be suppressed. Therefore, the distance between the rotor 32 and the stator 33 can be maintained substantially constant, and the deterioration of the function and reliability of the electric motor 30 due to the oil-pressure motor 11 can be suppressed. In addition, it is unnecessary to provide other members, such as an antivibration device configured to prevent vibrations. Thus, the number of parts can be reduced, and the cost reduction can be realized.

Further, the relative displacement of the rotating shaft 11 with respect to the rotor 32 due to, for example, the bending of the rotating shaft 11 by oil-pressure reaction force can be allowed by the spline joint portion 38 and the gaps S. With this, the difference of the requirement of the attachment accuracy between the oil-pressure motor 10 and the electric motor 30 can be absorbed. Therefore, the integration of the oil-pressure motor 10 and the electric motor 30 can be realized without using other complex joint members (for example, flexible coupling).

A permanent magnet 32b is provided on an outer peripheral surface portion of the iron core 32a. A cylindrical stator accommodating space 52 surrounded by the iron core 32a and the housing 34 is formed on an outer side of the permanent magnet 32b. The stator 33 is provided in the stator accommodating space 52 that is a second accommodating space so as to cover the permanent magnet 32b. The stator 33 is configured such that a stator coil winds around a cylindrical stator core. The stator 33 is fixed to an inner peripheral surface of the housing 34. An inner peripheral surface of the stator 33 is provided so as to be opposed to an outer peripheral surface of the permanent magnet 32b. The stator 33 is provided so as to cover one end portion of the oil-pressure motor 10.

Since the electric motor 30 configured as above is provided so as to cover the oil-pressure motor 10, the rotor 32 and the stator 33 are increased in diameter, and the electric motor 30 becomes a low revolution specification. To be specific, the optimal revolution of the electric motor 30 becomes the low revolution. With this, a transmission mechanism, such as a speed reducer or a speed increaser configured to cause the revolution of the oil-pressure motor 10 and the revolution of the electric motor 30 to coincide with each other, can be omitted. Therefore, the electricity-oil hybrid motor 1 can be reduced in size. Since mechanical loss by the transmission mechanism can be prevented, mechanical efficiency can be improved. In addition, operation noises by, for example, the reducer, can be reduced, and the cost reduction can be realized by the reduction in the number of parts.

Operations of Electricity-Oil Hybrid Motor

According to the electricity-oil hybrid motor 1, by supplying the operating oil to the inlet port 26 of the oil-pressure motor 10, the cylinder block 12 rotates, and the rotating shaft 11 rotates in conjunction with the rotation of the cylinder block 12. When the rotating shaft 11 rotates, the rotor 32 splined to the rotating shaft 11 rotates, and the output shaft 31 rotates in conjunction with the rotation of the rotor 32. Thus, the speed reducer 3 is driven. The electricity-oil hybrid motor 1 can also be rotated by the electric motor 30. By supplying predetermined electricity to the stator 33, the rotor 32 rotates, and the output shaft 31 rotates in conjunction with the rotation of the rotor 32.

According to the electricity-oil hybrid motor 1, both the oil-pressure motor 10 and the electric motor 30 can be driven. In this case, by supplying the operating oil to the inlet port 26 of the oil-pressure motor 10 and supplying the predetermined electricity to the stator 33, the rotor 32 rotates by the rotational force of the rotating shaft 11 and the rotational force of the stator 33. As above, by driving both the oil-pressure motor 10 and the electric motor 30, the energy consumption can be reduced.

In a case where the supply of the electricity to the electric motor 30 is stopped, and only the oil-pressure motor 10 is driven, the electric energy is generated by the stator 33 in the electric motor 30. To be specific, a regeneration operation is performed by the electric motor 30. Thus, the electric motor 30 can be utilized as a power generator. In contrast, in a case where the supply of the operating oil to the oil-pressure motor 10 is stopped, and only the electric motor 30 is driven, the compressed operating oil is ejected through the outlet port 27. Thus, the oil-pressure motor 10 can be utilized as an oil-pressure pump.

In the electricity-oil hybrid motor 1 configured as above, the electric motor 30 is attached, via the bearing 36, to an outer peripheral portion of the oil-pressure motor 10 which is less affected by internal vibrations. Therefore, the transfer of the vibrations to the rotor 32 can be prevented. In addition, the formation of a member for receiving the bearing 36 is unnecessary. Thus, the configuration of the electric motor 30 can be simplified.

According to the electricity-oil hybrid motor 1, the oil-pressure motor 10 and the electric motor 30 can be strongly connected to each other by using the spline joint portion 38. Thus, the electricity-oil hybrid motor 1 can be used under more severe environments than conventional technology. For example, the electricity-oil hybrid motor 1 can be used at high acceleration and a large number of vibrations.

Lubricating Structure

In the electricity-oil hybrid motor 1, the through hole 17b of the casing 17 is larger in diameter than the rotating shaft 11, and the lubricating oil in the casing 17 flows through a space around the rotating shaft 11 into the rotating shaft accommodating space 51 of the rotor 32. By the lubricating oil having flowed into the rotating shaft accommodating space 51, the bearing 36 is lubricated, and the rotor 32 smoothly rotates.

As above, respective components in the electric motor 30 are lubricated by the lubricating oil stored in the oil-pressure motor 10. With this, unlike conventional electric motors, it is unnecessary to use semisolid or paste lubricant, such as grease. Therefore, the electricity-oil hybrid motor 1 can be used under more severe conditions than before. For example, the electricity-oil hybrid motor 1 can be used under a high-load condition for a long period of time.

A first sealing member 39 is provided between an inner peripheral portion of the iron core 32a and an outer peripheral portion of one end side of the casing 17 covered with the iron core 32a. The first sealing member 39 separates the rotating shaft accommodating space 51 from the stator accommodating space 52 and prevents the lubricating oil from leaking to the stator accommodating space 52. As above, the rotor 32 is provided so as to cover the outer peripheral portion of one end side of the casing 17. Therefore, the lubricating oil can be prevented from leaking to the stator accommodating space 52 by one sealing member 39. Thus, the number of parts can be reduced, and the configuration of the electric motor 30 can be simplified.

The bearing 36 is provided on the rotating shaft accommodating space 51 side of the first sealing member 39 (that is, the bearing 36 is provided on a left side of the first sealing member 39 in FIGS. 1 and 2). With this arrangement, the lubricating oil can be prevented from flowing into the space between the stator 33 and the permanent magnet 32b while supplying the lubricating oil to the bearing 36. Thus, the operating liquid having the electrical conductivity or the magnetism can be used. Therefore, it is possible to increase the types of usable operating liquids. In addition, while preventing the deterioration in reliability and function of the electric motor 30 due to the lubricating oil, the above-described supply of the lubricant and the operation under more severe conditions than before can be realized.

The output shaft 31 includes a second sealing member 40 configured to seal a gap between the output shaft 31 and the bottom portion of the housing 34. The second sealing member 40 is provided on an inner side of the bearing 35 and can prevent the lubricating oil from flowing into the housing 34 from an outer side, that is, from the speed reducer 3. The bearing 35 is provided on an outer side of the second sealing member 40 so as to be lubricated by the lubricating oil supplied from the outer side. With this, the bearing 35 can also be lubricated by the lubricating oil.

Embodiment 2

Figure 4:
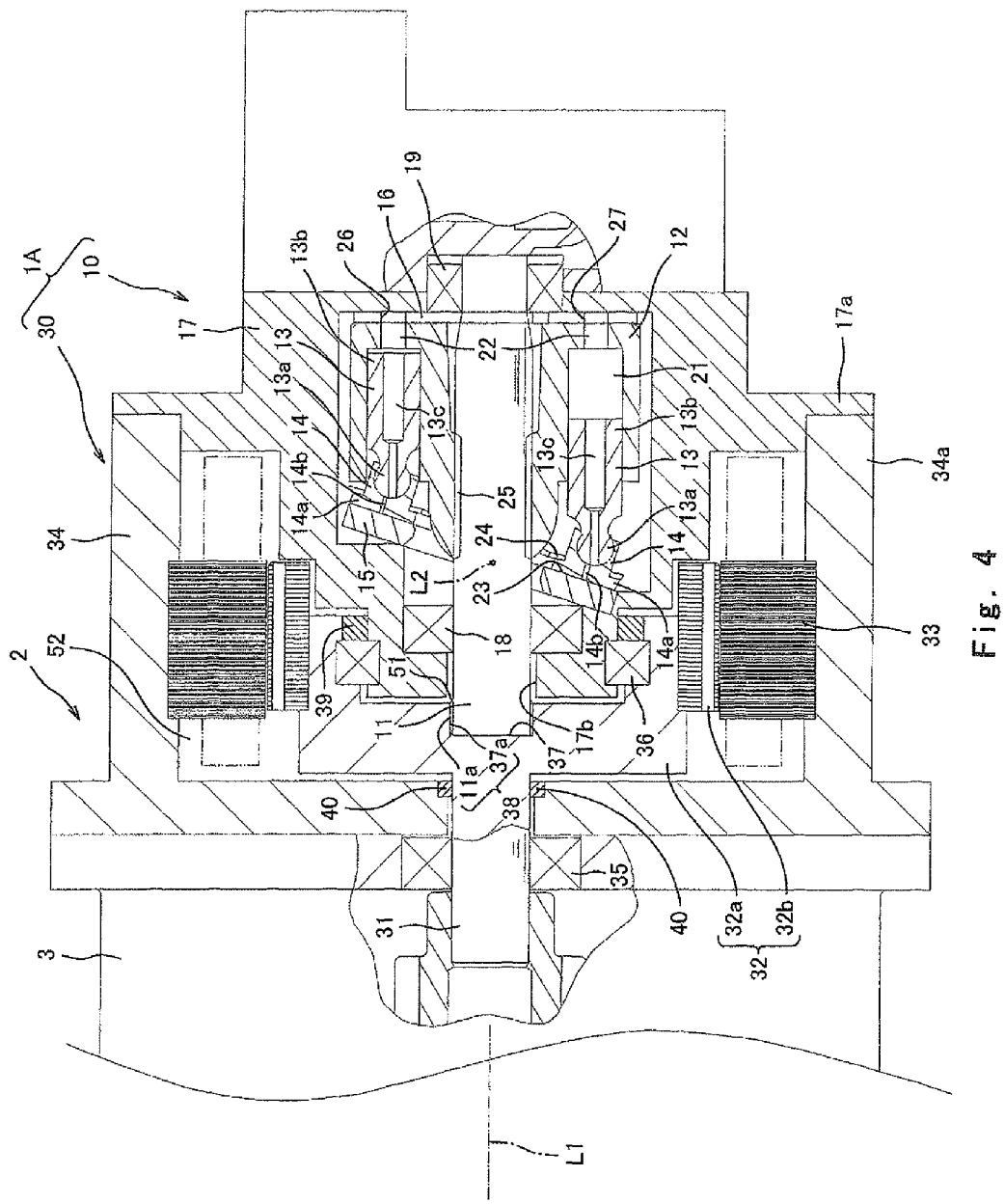
FIG. 4 is a cross-sectional view showing the electricity-oil hybrid motor of Embodiment 2.

FIG. 4 is a cross-sectional view showing an electricity-oil hybrid motor 1A of Embodiment 2. The electricity-oil hybrid motor 1A of Embodiment 2 is similar in configuration to the electricity-oil hybrid motor 1 of Embodiment 1. In the following, regarding the electricity-oil hybrid motor 1A, only the components different from the components of the electricity-oil hybrid motor 1 of Embodiment 1 will be explained. The same reference signs are used for the same components, and explanations thereof are omitted.

The electricity-oil hybrid motor 1A does not include the bearing 35 configured to support the output shaft 31. The output shaft 31 is rotatably supported by the bearing 35 provided at the speed reducer 3.

Even though the electricity-oil hybrid motor 1A is configured as above, it can obtain the same operational advantages as the electricity-oil hybrid motor 1 of Embodiment 1.

Embodiment 3

Figure 5:
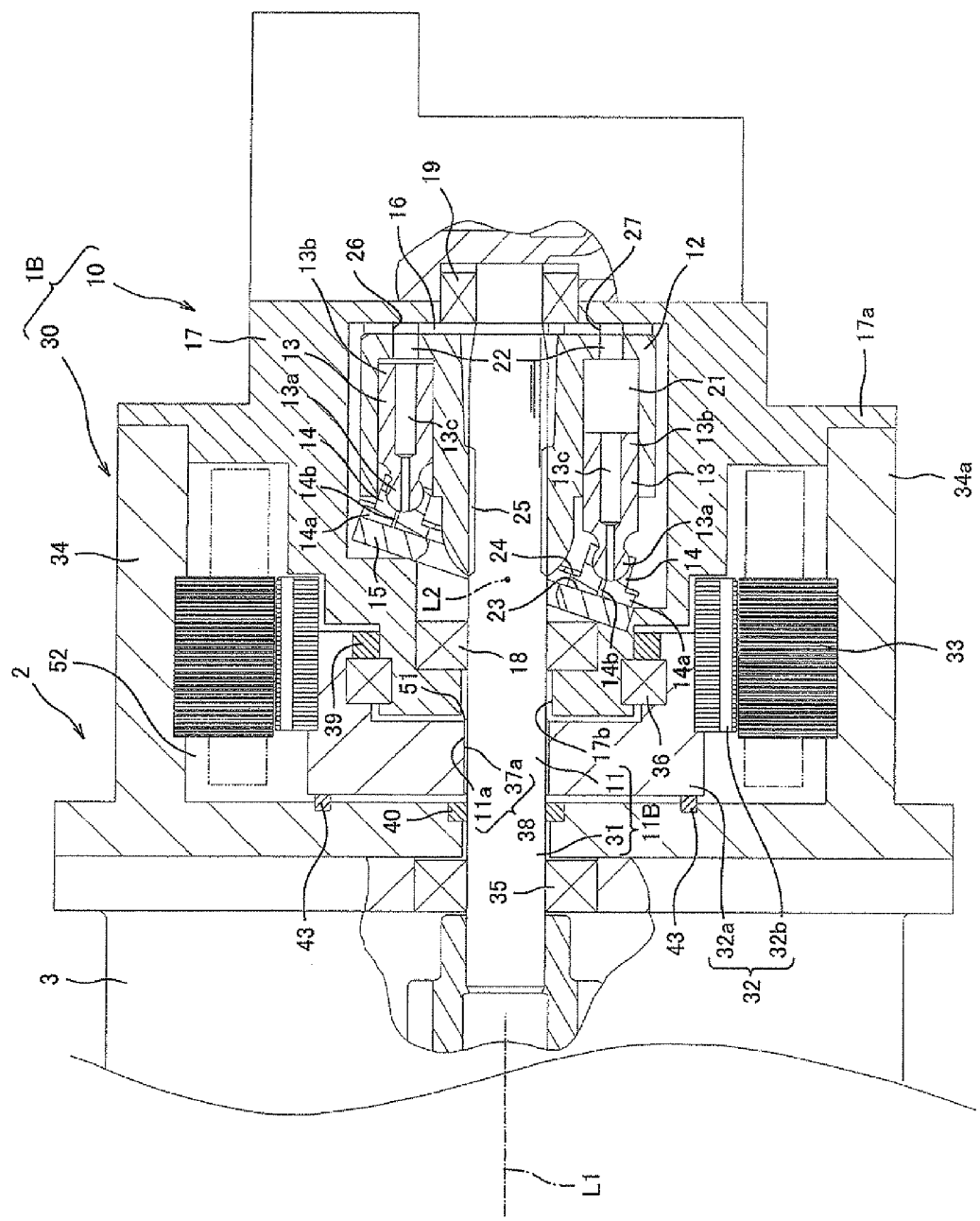
FIG. 5 is a cross-sectional view showing the electricity-oil hybrid motor of Embodiment 3.

FIG. 5 is a cross-sectional view showing an electricity-oil hybrid motor 1B of Embodiment 3. The electricity-oil hybrid motor 1B of Embodiment 3 is similar in configuration to the electricity-oil hybrid motor 1A of Embodiment 2. In the following, regarding the electricity-oil hybrid motor 1B, only the components different from the components of the electricity-oil hybrid motor 1A of Embodiment 2 will be explained. The same reference signs are used for the same components, and explanations thereof are omitted.

In the electricity-oil hybrid motor 1B, the output shaft 31 and rotor 32 of the electric motor 30 are formed as separate components, and the output shaft 31 and the rotating shaft 11 of the oil-pressure motor 10 are integrally formed. To be specific, a rotary output shaft 11B penetrates a bottom portion of the rotor 32 and the bottom portion of the housing 34, extends up to the speed reducer 3, and is coupled to the speed reducer 3. The second sealing member 40 is provided between the bottom portion of the housing 34 and the rotary output shaft 11B.

Keys 11a are formed on an outer peripheral surface of a portion of the rotary output shaft 11B, the portion penetrating the rotor 32. Keyways 37a are formed on the iron core 32a of the rotor 32 so as to correspond to the keys 11a. The keys 11a and the keyways 37a constitute the spline joint portion 38, and the rotary output shaft 11B and the rotor 32 engage with each other.

A third sealing member 43 is provided between the rotor 32 and the housing 34. The inner space of the rotor 32 is the rotating shaft accommodating space 51 formed between two sealing members 39 and 43. The bearing 36 is provided in the rotating shaft accommodating space 51. As above, by providing the first sealing member 39 and the third sealing member 43, the rotating shaft accommodating space 51 and the stator accommodating space 52 are separated from each other. With this, the lubricating oil can be prevented from flowing into the stator accommodating space 52, and the bearing 36 can be lubricated by the lubricating oil.

In the electricity-oil hybrid motor 1B configured as above, by separately forming the output shaft 31 and the rotor 32, the shape of the rotor 32 is simplified. With this, the transfer of the axial and radial vibrations of the rotary output shaft 11 to the rotor 32 can be prevented, and the assembly accuracy of this portion can be set to a low level.

Other than the above, the electricity-oil hybrid motor 1B can obtain the same operational advantages as the electricity-oil hybrid motors 1 and 1A of Embodiments 1 and 2.

Embodiment 4

Figure 6:
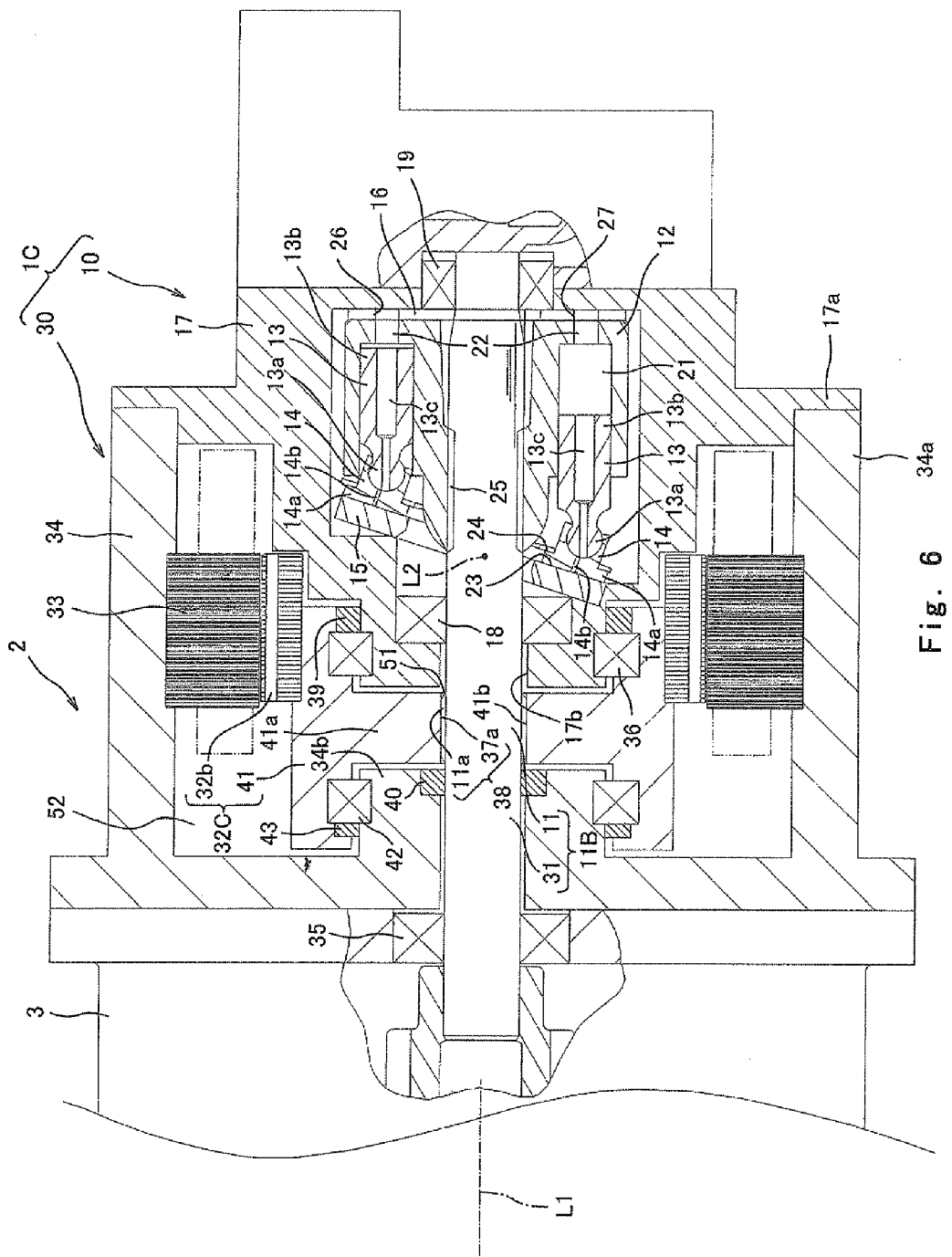
FIG. 6 is a cross-sectional view showing the electricity-oil hybrid motor of Embodiment 4.

FIG. 6 is a cross-sectional view showing an electricity-oil hybrid motor 1C of Embodiment 4. The electricity-oil hybrid motor 1C of Embodiment 4 is similar in configuration to the electricity-oil hybrid motor 1B of Embodiment 3. In the following, regarding the electricity-oil hybrid motor 1C, only the components different from the components of the electricity-oil hybrid motor 1B of Embodiment 2 will be explained. The same reference signs are used for the same components, and explanations thereof are omitted.

In the electricity-oil hybrid motor 1C, a rotor 32C of an electric motor 30C includes a cylindrical iron core 41. The iron core 41 includes an inward flange portion 41a formed on an intermediate portion of an inner peripheral surface of the iron core 41 and projecting inward in the radial direction. The rotary output shaft 11B is inserted through a through hole 41b defined by a tip end of the inward flange portion 41a. A plurality of keys 11a are formed on the outer peripheral surface of the rotary output shaft 11B at positions corresponding to the through hole 41b so as to be spaced apart from one another in the circumferential direction. A plurality of keyways 37a are formed on the through hole 41b so as to be spaced apart from one another in the circumferential direction.

In the rotor 32C configured as above, one end portion of the oil-pressure motor 10 is inserted through one opening of the iron core 41, and one end portion of the iron core 41 is rotatably supported by the outer peripheral surface of the oil-pressure motor 10 via the bearing 36. In addition, a cylindrical supporting portion 34b extending inward from the bottom portion of the housing 34 so as to surround the rotary output shaft 11B is inserted through the other opening of the iron core 41, and the other end portion of the iron core 41 is rotatably supported by the supporting portion 34b via a bearing 42. As above, by providing two bearings 36 and 42 on one end side and the other end side of the iron core 41, the rotor 32C can be caused to rotate stably.

In the vicinity of one opening of the iron core 41, the first sealing member 39 is provided between one end portion of the iron core 41 and the outer peripheral surface of the oil-pressure motor 10. In the vicinity of the other opening of the iron core 41, the third sealing member 43 having an annular shape is provided between the other end portion of the iron core 41 and the supporting portion 34b. In the iron core 41, the rotating shaft accommodating space 51 is formed between these two sealing members 39 and 43, and the bearings 36 and 42 are provided in the rotating shaft accommodating space 51. As above, by providing the first and third sealing members 39 and 43, the rotating shaft accommodating space 51 and the stator accommodating space 52 can be separated from each other. Thus, the stator 33 can be separated from the lubricating oil, and the bearings 36 and 42 can be lubricated by the operating oil having flowed from the casing 17.

Other than the above, the electricity-oil hybrid motor 1C can obtain the same operational advantages as the electricity-oil hybrid motors 1, 1B, and 1C of Embodiments 1 to 3.

Other Configurations

The present embodiments have explained the electricity-oil hybrid motor 1 including the oil-pressure motor 10. However, the present embodiments are not limited to the oil-pressure motor. A motor configured to drive by the operating liquid, such as water, may be used. Instead of the oil-pressure motor 10, an oil-pressure pump may be used. In this case, the electric motor 30 causes the rotor 32 to rotate, and thus the rotating shaft 11 rotates. With this, the operating oil can be ejected from the oil-pressure pump. Instead of the electric motor 30, a power generator may be used. In this case, the oil-pressure motor 10 causes the rotating shaft 11 to rotate, and thus the rotor rotates. With this, the stator 33 generates electromotive force, and thus the power generator generates electric power.

The present invention is not limited to the above embodiments. Additions, eliminations, and modifications may be made within the spirit of the present invention.

REFERENCE SIGNS LIST 1, 1A, 1B, 1C electricity-oil hybrid motor
2 driving device
3 speed reducer
10 oil-pressure motor
11 rotating shaft
11a key
11B rotary output shaft
17 casing
30, 30C electric motor
31 output shaft
32, 32C rotor
33 stator
34 housing
35, 36, 42 bearing
37a keyway
38 spline joint portion
39 first sealing member
40 second sealing member
43 third sealing member

The invention claimed is:

1. An electricity-liquid hybrid liquid-pressure apparatus comprising:
a liquid-pressure rotating device configured to cause a rotating shaft to rotate by supply of an operating liquid or configured to eject the operating liquid in accordance with rotation of the rotating shaft, the rotating shaft projecting from a casing of the liquid-pressure rotating device; and
an electric rotating device configured to have a power generator function of converting rotational energy of the rotating shaft of the liquid-pressure rotating device into electric energy or an electric motor function of driving the rotating shaft of the liquid-pressure rotating device by supply of the electric energy, wherein:
the electric rotating device includes a rotor connected to the rotating shaft, a stator provided around the rotor, and a housing in which the rotor and the stator are accommodated;
the rotor and the housing are provided so as to surround the casing;
the housing includes a first accommodating space in which the rotating shaft projecting from the casing is accommodated and a second accommodating space in which the stator is accommodated; and
a sealing member configured to separate the first accommodating space from the second accommodating space is provided in the housing.

2. The electricity-liquid hybrid liquid-pressure apparatus according to claim 1, wherein: the rotor is rotatably provided at the casing via a first bearing member; and the bearing member is provided in the first space.

3. The electricity-liquid hybrid liquid-pressure apparatus according to claim 2, wherein:
the rotating shaft penetrates the rotor and the housing and projects to outside of the housing; and
the rotor and the rotating shaft engage with each other so as not to be relatively rotatable with respect to each other.

4. The electricity-liquid hybrid liquid-pressure apparatus according to claim 3, wherein the rotor is formed in a tubular shape and is provided such that one end side and the other end side thereof are rotatably supported by the casing and the housing via the bearing member and a different bearing member, respectively.

5. An industrial machinery comprising the electricity-liquid hybrid liquid-pressure apparatus according to claim 4.

6. An industrial machinery comprising the electricity-liquid hybrid liquid-pressure apparatus according to claim 3.

7. The electricity-liquid hybrid liquid-pressure apparatus according to claim 2, further comprising an input-output shaft configured to receive or output rotational force, wherein:
the input-output shaft is formed integrally with the rotor;
the rotating shaft engages with the rotor so as not to be relatively rotatable with respect to the rotor;
the rotor is formed in a bottomed tubular shape and is provided at the casing so as to close a through hole of the casing from which the rotating shaft projects; and
the sealing member is provided between an inner peripheral portion of the rotor and an outer peripheral portion of the casing.

8. An industrial machinery comprising the electricity-liquid hybrid liquid-pressure apparatus according to claim 7.

9. An industrial machinery comprising the electricity-liquid hybrid liquid-pressure apparatus according to claim 2.

10. The electricity-liquid hybrid liquid-pressure apparatus according to claim 1, further comprising an input-output shaft configured to receive or output rotational force, wherein:
the input-output shaft is formed integrally with the rotor;
the rotating shaft engages with the rotor so as not to be relatively rotatable with respect to the rotor;
the rotor is formed in a bottomed tubular shape and is provided at the casing so as to close a through hole of the casing from which the rotating shaft projects; and
the sealing member is provided between an inner peripheral portion of the rotor and an outer peripheral portion of the casing.

11. An industrial machinery comprising the electricity-liquid hybrid liquid-pressure apparatus according to claim 10.

12. An industrial machinery comprising the electricity-liquid hybrid liquid-pressure apparatus according to claim 1.

* * * * *